US012656769B2

(12) United States Patent
Haitsuka et al.

(10) Patent No.: US 12,656,769 B2
(45) Date of Patent: Jun. 16, 2026

(54) PREDICTION APPARATUS, PREDICTION METHOD, AND PROGRAM

(71) Applicant: DAICEL CORPORATION, Osaka (JP)

(72) Inventors: Masahiro Haitsuka, Tokyo (JP); Hidetoshi Kozono, Tokyo (JP); Fumihiro Miyoshi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 388 days.

(21) Appl. No.: 17/797,348

(22) PCT Filed: Feb. 4, 2021

(86) PCT No.: PCT/JP2021/004168
§ 371 (c)(1),
(2) Date: Aug. 3, 2022

(87) PCT Pub. No.: WO2021/157667
PCT Pub. Date: Aug. 12, 2021

(65) Prior Publication Data
US 2023/0057943 A1 Feb. 23, 2023

(30) Foreign Application Priority Data
Feb. 4, 2020 (JP) ................................ 2020-017475

(51) Int. Cl.
*G05B 23/02* (2006.01)
(52) U.S. Cl.
CPC ....... *G05B 23/0264* (2013.01); *G05B 23/024* (2013.01)
(58) Field of Classification Search
None
See application file for complete search history.

(56) References Cited

U.S. PATENT DOCUMENTS 5,062,066 A 10/1991 Scher et al.
9,760,933 B1* 9/2017 Cai .................... G06Q 30/0627
(Continued)

FOREIGN PATENT DOCUMENTS

JP 2001-106703 A 4/2001
JP 2001-325582 A 11/2001
(Continued)

OTHER PUBLICATIONS

International Search Report for International Application No. PCT/JP2021/004168, dated Apr. 27, 2021, with an English translation.
(Continued)

*Primary Examiner* — Hua Lu
(74) *Attorney, Agent, or Firm* — BIRCH, STEWART, KOLASCH & BIRCH, LLP

(57) ABSTRACT

To improve prediction accuracy of a process including a reaction in a chemical plant. A prediction apparatus includes a process data processing unit that performs a predetermined processing process on process data obtained from a chemical plant, and a prediction model generation unit that generates a prediction model having learned features of the process data obtained from the chemical plant, on the basis of causality information that defines a combination of first process data and second process data or a value corresponding to the second process data among the process data obtained from the chemical plant or the process data processed by the process data processing unit. The first process data is used as an explanatory variable. The second process data or the value corresponding to the second process data is used as a response variable. Furthermore, the process data processing unit obtains a value corresponding to a reaction rate of a processing target in a predetermined period by using the process data.

8 Claims, 21 Drawing Sheets

(56)                    References Cited

U.S. PATENT DOCUMENTS

| | | | | |
|---|---|---|---|---|
| 10,970,651 | B1* | 4/2021 | Barker | G06N 20/10 |
| 2002/0049625 | A1* | 4/2002 | Kilambi | G06F 30/00 |
| | | | | 706/62 |
| 2003/0120361 | A1* | 6/2003 | Anderson | C08F 10/00 |
| | | | | 700/28 |
| 2006/0210444 | A1* | 9/2006 | Asano | B01J 19/0093 |
| | | | | 422/400 |
| 2009/0012631 | A1* | 1/2009 | Fuller | G05B 9/02 |
| | | | | 700/1 |
| 2009/0192745 | A1* | 7/2009 | Kamath | A61B 5/14532 |
| | | | | 702/85 |
| 2012/0290104 | A1* | 11/2012 | Holt | G06Q 10/00 |
| | | | | 706/14 |
| 2013/0111878 | A1* | 5/2013 | Pachner | F02D 41/0235 |
| | | | | 60/274 |
| 2013/0256113 | A1* | 10/2013 | Tumiatti | C10B 49/14 |
| | | | | 422/187 |
| 2013/0297549 | A1* | 11/2013 | Yano | G06Q 10/04 |
| | | | | 706/46 |
| 2014/0217036 | A1* | 8/2014 | Bremer | C02F 1/725 |
| | | | | 210/748.14 |
| 2016/0364456 | A1* | 12/2016 | Trenchard | G06F 16/2465 |
| 2018/0081350 | A1* | 3/2018 | Seki | G05B 23/0267 |
| 2018/0285766 | A1* | 10/2018 | Shen | G06F 11/3017 |
| 2019/0101908 | A1* | 4/2019 | Park | G05B 23/0254 |
| 2019/0188584 | A1* | 6/2019 | Rao | G05B 23/024 |
| 2019/0198136 | A1* | 6/2019 | Hou | G16C 20/90 |
| 2019/0258234 | A1* | 8/2019 | Kaye | G05B 19/41885 |
| 2019/0331656 | A1* | 10/2019 | Chaum | G01N 27/48 |
| 2019/0347590 | A1* | 11/2019 | Rajasekaran | G06Q 10/0635 |
| 2019/0358601 | A1* | 11/2019 | Kern | B01J 6/008 |
| 2019/0392360 | A1* | 12/2019 | Kweon | G05B 23/0283 |
| 2020/0096993 | A1* | 3/2020 | Cella | G06F 3/0635 |
| 2020/0272974 | A1* | 8/2020 | Sato | G05B 19/41875 |
| 2021/0069361 | A1* | 3/2021 | Schmidt-Bleker | A61L 2/14 |
| 2021/0088986 | A1* | 3/2021 | Furuichi | G06F 30/27 |
| 2021/0139390 | A1* | 5/2021 | Fukubayashi | C08G 69/32 |
| 2021/0201079 | A1* | 7/2021 | Watanabe | G06F 18/2148 |
| 2021/0338552 | A1* | 11/2021 | Ujimoto | A61K 8/86 |
| 2022/0148114 | A1* | 5/2022 | Bingham | G06Q 10/0633 |
| 2022/0198284 | A1* | 6/2022 | Inaba | G05D 21/02 |
| 2023/0104043 | A1* | 4/2023 | Ferraro | G06F 30/27 |
| | | | | 703/2 |
| 2024/0085878 | A1* | 3/2024 | Schneider | G05B 23/024 |

FOREIGN PATENT DOCUMENTS

| | | | |
|---|---|---|---|
| JP | 2003-526856 | A | 9/2003 |
| JP | 2009-20787 | A | 1/2009 |
| JP | 2011-58102 | A | 3/2011 |
| JP | 5751045 | B2 | 7/2015 |
| JP | 2018-120343 | A | 8/2018 |
| JP | 6477423 | B2 | 3/2019 |
| JP | 2019-74969 | A | 5/2019 |
| WO | WO 2012/093483 | A1 | 7/2012 |
| WO | WO 2018/009643 | A1 | 1/2018 |

OTHER PUBLICATIONS

Written Opinion of the International Searching Authority for International Application No. PCT/JP2021/004168, dated Apr. 27, 2021, with an English translation.

Extended European Search Report for European Application No. 21751321.7, dated Feb. 6, 2024.

Caputo et al., "Parametric and neural methods for cost estimation of process vessels," International Journal of Production Economics, vol. 112, 2008, pp. 934-954.

Extended European Search Report for European Application No. 21750645.0, dated Jan. 30, 2024.

International Search Report for International Application No. PCT/JP2021/004179, dated Apr. 13, 2021, with English translation.

U.S. Office Action for U.S. Appl. No. 17/797,343, dated Sep. 29, 2024.

Written Opinion of the International Searching Authority for International Application No. PCT/JP2021/004179, dated Apr. 13, 2021, with English translation.

* cited by examiner

| SENSOR / TAG (ASSUMED CAUSE) | PRE-COOLER LIQUID SURFACE 003 | PRE-COOLING TEMPERATURE 004 | PRETREATMENT CURRENT 001 | PRETREATMENT TEMPERATURE 002 | REACTOR FLOW RATE 005 | REACTOR TEMPERATURE 006 | REACTOR TEMPERATURE 007 | ... |
|---|---|---|---|---|---|---|---|---|
| INCREASE IN AMOUNT OF SECONDARY RAW MATERIAL A | 1 | | | | | | | ... |
| DECREASE IN THE AMOUNT OF SECONDARY RAW MATERIAL A | -1 | | | | | | | ... |
| INCREASE IN TEMPERATURE OF SECONDARY RAW MATERIAL A | | 1 | | | | | | ... |
| DECREASE IN TEMPERATURE OF SECONDARY RAW MATERIAL A | | -1 | | | | | | ... |
| INCREASE IN REACTOR CHARGE | | | 1 | | | | | ... |
| DECREASE IN REACTOR CHARGE | | | -1 | | | | | ... |
| INCREASE IN PRETREATMENT TEMPERATURE | | | | 1 | | | | ... |
| DECREASE IN PRETREATMENT TEMPERATURE | | | | -1 | | | | ... |
| FLOW REDUCTION IN REACTION STEP | | | | | 1 | | | ... |
| FLOW INCREASE IN REACTION STEP | | | | | -1 | | | ... |
| TEMPERATURE INCREASE IN REACTION STEP | | | | | | 1 | | ... |
| TEMPERATURE DROP IN REACTION STEP | | | | | | -1 | | ... |
| REACTOR LEAKAGE | | | | | | | 1 | ... |
| PRETREATMENT MACHINE MECHANICAL SEAL LEAKAGE | | | | | | | 1 | ... |
| ... | ... | ... | ... | ... | ... | ... | ... | ... |

FIG. 4

| TAG | SEQUENCE | PRODUCT TYPE | PRIMARY PROCESSING | | | | | OPERATING CONDITIONS OPTIMIZATION | | | | | |
|---|---|---|---|---|---|---|---|---|---|---|---|---|---|
| | | | BATCH STAGE | METHOD | DATA INTERVAL | | SMOOTHING | ADJUST/ MONITOR | COST IMPACT (UNIT PRICE) | MANAGEMENT RANGE | | SETTING RANGE | |
| | | | | | START | END | | | | UPPER LIMIT | LOWER LIMIT | UPPER LIMIT | LOWER LIMIT |
| 001 | ⋮ | ⋮ | PRETREATMENT | NONE | | | | ADJUST | ⋮ | ⋮ | ⋮ | | |
| 002 | ⋮ | ⋮ | PRETREATMENT | INSTANTANEOUS VALUE | ⋮ | | | MONITOR | ⋮ | ⋮ | ⋮ | | |
| 003 | ⋮ | ⋮ | PRE-COOLING | AVERAGE | ⋮ | ⋮ | | ADJUST | ⋮ | ⋮ | ⋮ | | |
| 004 | ⋮ | ⋮ | PRE-COOLING | INTEGRAL | ⋮ | ⋮ | | ADJUST | | | | | |
| 005 | ⋮ | ⋮ | REACTION | NONE | | | REQUIRED | MONITOR | | ⋮ | ⋮ | ⋮ | ⋮ |
| 006 | ⋮ | ⋮ | REACTION | AVERAGE | ⋮ | ⋮ | | ADJUST | | | | | |
| 007 | ⋮ | ⋮ | REACTION | INTEGRAL | ⋮ | ⋮ | | MONITOR | ⋮ | ⋮ | ⋮ | ⋮ | ⋮ |
| ⋮ | ⋮ | ⋮ | ⋮ | ⋮ | ⋮ | ⋮ | ⋮ | ⋮ | | | | ⋮ | ⋮ |

FIG. 5

| COMBINATION ID | TAG | FACTOR/INFLUENCE | CAUSALITY (POSITIVE/NEGATIVE) | LEARNING PERIOD ΔT |
|---|---|---|---|---|
| C1 | 001 | FACTOR | POSITIVE | |
| C1 | 003 | INFLUENCE | | 100 |
| C2 | 003 | FACTOR | NEGATIVE | |
| C2 | 005 | INFLUENCE | | 100 |
| C3 | 002 | FACTOR | POSITIVE | |
| C3 | 006 | INFLUENCE | | 30 |
| C4 | 004 | FACTOR | NEGATIVE | |
| C4 | 005 | FACTOR | POSITIVE | |
| C4 | 006 | FACTOR | POSITIVE | |
| C4 | 007 | INFLUENCE | | 30 |
| ... | ... | ... | ... | ... |
| C11 | 101 | FACTOR | POSITIVE | |
| C11 | 102 | FACTOR | NEGATIVE | |
| C11 | 103 | FACTOR | POSITIVE | |
| C11 | 104 | INFLUENCE | | 100 |
| ... | ... | ... | ... | ... |

FIG. 6

| TAG | TYPE | RESIDENCE TIME | BATCH-RELATED TAG | | | | OPERATING CONDITION OPTIMIZATION | | | | | | |
| | | | | | | ADJUST/MONITOR | COST IMPACT (UNIT PRICE) | MANAGEMENT RANGE | | SETTING RANGE | | |
| | | | | | | | | UPPER LIMIT | LOWER LIMIT | UPPER LIMIT | LOWER LIMIT | |
| 101 | BATCH | ⋮ | 009 | ⋮ | ⋮ | ADJUST | ⋮ | ⋮ | ⋮ | | |
| 102 | CONTINUOUS | ⋮ | | | | MONITOR | | ⋮ | ⋮ | | |
| 103 | CONTINUOUS | ⋮ | | | | ADJUST | | ⋮ | ⋮ | | |
| 104 | QUALITY | ⋮ | ⋮ | ⋮ | ⋮ | MONITOR | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ |

FIG. 11

| DATE AND TIME | S/N | PRODUCT TYPE | STEP | TAG | |
|---|---|---|---|---|---|
| | | | | | 001 |
| YYYYMMDD HH:MM:SS | ⋮ | ⋮ | ⋮ | ⋮ | ⋮ |
| YYYYMMDD HH:MM:SS | ⋮ | ⋮ | ⋮ | ⋮ | ⋮ |
| YYYYMMDD HH:MM:SS | ⋮ | ⋮ | ⋮ | ⋮ | ⋮ |
| ⋮ | ⋮ | ⋮ | ⋮ | ⋮ | ⋮ |

FIG. 15

| S/N | END DATE AND TIME | TAG | |
|-----|-------------------|-----|-----|
| | | 001 | 002 |
| ⋮ | YYYYMMDD HH:MM:SS | ⋮ | ⋮ |
| ⋮ | YYYYMMDD HH:MM:SS | ⋮ | ⋮ |
| ⋮ | YYYYMMDD HH:MM:SS | ⋮ | ⋮ |
| ⋮ | ⋮ | ⋮ | ⋮ |

FIG. 17

| S/N | 001 | 002 | 003 | 004 | 005 | 006 | 007 |
|---|---|---|---|---|---|---|---|
| 001 | MEASURED VALUE | MEASURED VALUE | MEASURED VALUE | MEASURED VALUE | MEASURED VALUE | MEASURED VALUE | MEASURED VALUE |
| 002 | MEASURED VALUE | MEASURED VALUE | MEASURED VALUE | MEASURED VALUE | MEASURED VALUE | MEASURED VALUE | MEASURED VALUE |
| 003 | MEASURED VALUE | MEASURED VALUE | MEASURED VALUE | MEASURED VALUE | PREDICTED VALUE | PREDICTED VALUE | PREDICTED VALUE |
| 004 | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

FIG. 18

| S/N | 001 | 002 | 003 | 004 | 005 | 006 | 007 |
|---|---|---|---|---|---|---|---|
| 001 | MEASURED VALUE | MEASURED VALUE | MEASURED VALUE | MEASURED VALUE | MEASURED VALUE | MEASURED VALUE | MEASURED VALUE |
| 002 | MEASURED VALUE | MEASURED VALUE | MEASURED VALUE | MEASURED VALUE | MEASURED VALUE | MEASURED VALUE | MEASURED VALUE |
| 003 | MEASURED VALUE | MEASURED VALUE | MEASURED VALUE | MEASURED VALUE | PREDICTED VALUE | PREDICTED VALUE | PREDICTED VALUE |
| 004 | MEASURED VALUE | MEASURED VALUE | PREDICTED VALUE | S/N 003 | PREDICTED VALUE | PREDICTED VALUE | PREDICTED VALUE |
| ... | ... | ... | ... | ... | ... | ... | ... |

FIG. 19

| DATE AND TIME | PRODUCT TYPE | TAG | |
|---|---|---|---|
| | | 102 | ... |
| YYYYMMDD HH:MM:SS | ... | ... | ... |
| YYYYMMDD HH:MM:SS | ... | ... | ... |
| YYYYMMDD HH:MM:SS | ... | ... | ... |
| ... | ... | ... | ... |

FIG. 20

| S/N | TAG |
|---|---|
| | 101 |
| ... | ... |
| ... | ... |
| ... | ... |
| ... | ... |

FIG. 21

| STAGE INSPECTION ID | SAMPLING | | TAG | |
|---|---|---|---|---|
| | START DATE AND TIME | END DATE AND TIME | 101 | ... |
| S001 | ... | ... | ... | ... |
| S002 | ... | ... | ... | ... |
| S003 | ... | ... | ... | ... |
| ... | ... | ... | ... | ... |

PREDICTION APPARATUS, PREDICTION METHOD, AND PROGRAM

CROSS REFERENCE TO RELATED APPLICATIONS

This application is the National Phase of PCT/JP2021/004168 filed on Feb. 4, 2021, which claims priority under 35 U.S.C. § 119 (a) to Patent Application No. 2020-017475 filed in Japan on Feb. 4, 2020, all of which are hereby expressly incorporated by reference into the present application.

FIELD

The present disclosure relates to a prediction apparatus, a prediction method, and a program.

BACKGROUND

In the related art, there have been proposed techniques for predicting the quality of products in a manufacturing process or controlling operations on the basis of prediction. For example, there has been proposed a prediction system that predicts characteristic values of a product during manufacturing in a manufacturing process, and calculates control conditions of the manufacturing process of a post-stage on the basis of prediction results thereof (Patent Document 1). This system includes:

a database that stores, on lot-by-lot basis, data measured in respective stages of the manufacturing process and/or data indicative of a state of the manufacturing process;

a mathematical expression model generation unit that generates a mathematical expression model of the manufacturing process by using the data stored in the database;

a product characteristic prediction unit that predicts a characteristic value of a product for a lot in course of manufacture by substituting into the mathematical expression model, an actual result value for a processed stage or a representative value obtained based on a past lot for an unprocessed stage; and an optimum manufacturing condition calculation unit that calculates an optimum manufacturing condition of a stage to be controlled in the unprocessed stage according to the prediction result of the product characteristic prediction unit. Prediction by the product characteristic prediction unit and calculation by the optimum manufacturing condition calculation unit is performed on the lot in course of manufacture for each predetermined stage to be controlled.

PRIOR ART DOCUMENT

Patent Document

Patent Document 1: JP 6477423 B
Patent Document 2: JP 5751045 B
Patent Document 3: JP 2018-120343 A
Patent Document 4: JP 2001-106703 A

SUMMARY

Technical Problem

However, particularly, it is difficult to improve prediction accuracy in a process including a reaction in a chemical plant. Therefore, an object of the present technology is to improve prediction accuracy of a process including a reaction in a chemical plant.

Solution to Problem

In accordance with an aspect of the present disclosure, a prediction apparatus includes: a process data processing unit that performs a predetermined processing process on process data obtained from a chemical plant; and a prediction model generation unit that generates a prediction model having learned features of the process data obtained from the chemical plant, on the basis of causality information that defines a combination of first process data and second process data or a value corresponding to the second process data among the process data obtained from the chemical plant or the process data processed by the process data processing unit. The first process data is used as an explanatory variable. The second process data or the value corresponding to the second process data is used as a response variable. Furthermore, the process data processing unit obtains a value corresponding to a reaction rate of a processing target in a predetermined period by using the process data.

In general, since a reaction is nonlinear due to the influence of temperature and the like, it is difficult to predict the features of process data on the basis of, for example, a peak value, a difference value, an integral value, and the like of the process data. The value corresponding to the reaction rate as described above is, for example, an explanatory variable that correlates with a reaction amount per hour. By generating a prediction model using the value corresponding to the reaction rate, it is possible to improve prediction accuracy of a process including a reaction in a chemical plant.

Furthermore, the value corresponding to the reaction rate may be an integral value of the reaction rate. Furthermore, the value corresponding to the reaction rate may be calculated by using an Arrhenius equation, and a frequency factor and activation energy of a reaction rate constant may be determined according to a type of chemical reaction and a processing target in the chemical plant. Specifically, such a value can be employed.

Furthermore, the process data processing unit further obtains an integral value, a differential value, an average value, a maximum value, or a minimum value of the process data in a predetermined period, or an instantaneous value of the process data at a predetermined time point according to a type of the process data. By performing such processing on the process data, the prediction accuracy of the prediction model can be improved.

Furthermore, the prediction model may have a hierarchical structure including a plurality of prediction equations, and includes a second prediction equation in which a predicted value calculated by a first prediction equation is included as an explanatory variable. For example, in this way, a plurality of causalities can be expressed by a function.

Furthermore, the value corresponding to the second process data may be a value obtained by sampling a plurality of second process data by a sample size reduction method, and the prediction model generation unit may generate the prediction model by correlating a range of acquisition timing of the first process data with calculation timing of the value corresponding to the second process data in the chemical plant, on the basis of a residence time of the processing target in the chemical plant. When a processing target is continuously processed in the chemical plant, it is possible to improve the accuracy of prediction by appropriately correlating the acquisition timing of process data being used as an explanatory variable with the acquisition timing of process data being used as a response variable.

Furthermore, the chemical plant may perform a batch stage of sequentially processing a processing target for each predetermined processing unit and a subsequent continuous stage of continuously processing the processing target, and the prediction model generation unit may generate the prediction model by correlating a range of completion timing of the batch stage and the calculation timing of the value corresponding to the second process data on the basis of the residence time of the processing target in the chemical plant. Even when the batch stage and the continuous stage are continuously performed, it is possible to improve the accuracy of prediction by appropriately correlating process data using an explanatory variable with process data using a response variable.

Note that the contents described in Solution to Problem can be combined as much as possible without departing from the problems and technical idea of the present disclosure. Furthermore, the contents of Solution to Problem can be provided as a system including a device, such as a computer, or a plurality of devices, a method performed by the computer, or a program executed by the computer. Note that a recording medium for storing the program may be provided.

Advantageous Effects of Invention

According to the disclosed technology, the accuracy of predicting characteristic values of a product can be improved.

BRIEF DESCRIPTION OF DRAWINGS

FIG. 4 is a diagram illustrating an example of information registered in advance on a knowledge base.

FIG. 5 is a diagram illustrating an example of a tag attribute table of a batch stage, which is generated on the basis of a knowledge base.

FIG. 6 is a diagram illustrating an example of a tag combination table generated on the basis of a knowledge base.

FIG. 11 is a diagram illustrating an example of a tag attribute table of a continuous stage, which is generated on the basis of a knowledge base.

FIG. 15 is a diagram illustrating an example of a writing array for a batch stage.

FIG. 17 is a diagram illustrating a batch array.

FIG. 18 is a diagram for explaining process data to be substituted into a prediction equation or the predicted value thereof.

FIG. 19 is a diagram illustrating another example for explaining process data to be substituted into a prediction equation or the predicted value thereof.

FIG. 20 is a diagram illustrating an example of a writing array for storing data of the type "continuous".

FIG. 21 is a diagram illustrating an example of a writing array for storing data of the type "batch".

FIG. 22 is a diagram illustrating an example of a combination ID data array that stores process data after processing in a continuous stage.

DESCRIPTION OF EMBODIMENTS

Hereinafter, an embodiment of a prediction apparatus is described with reference to the drawings.

Embodiment

Figure 1:
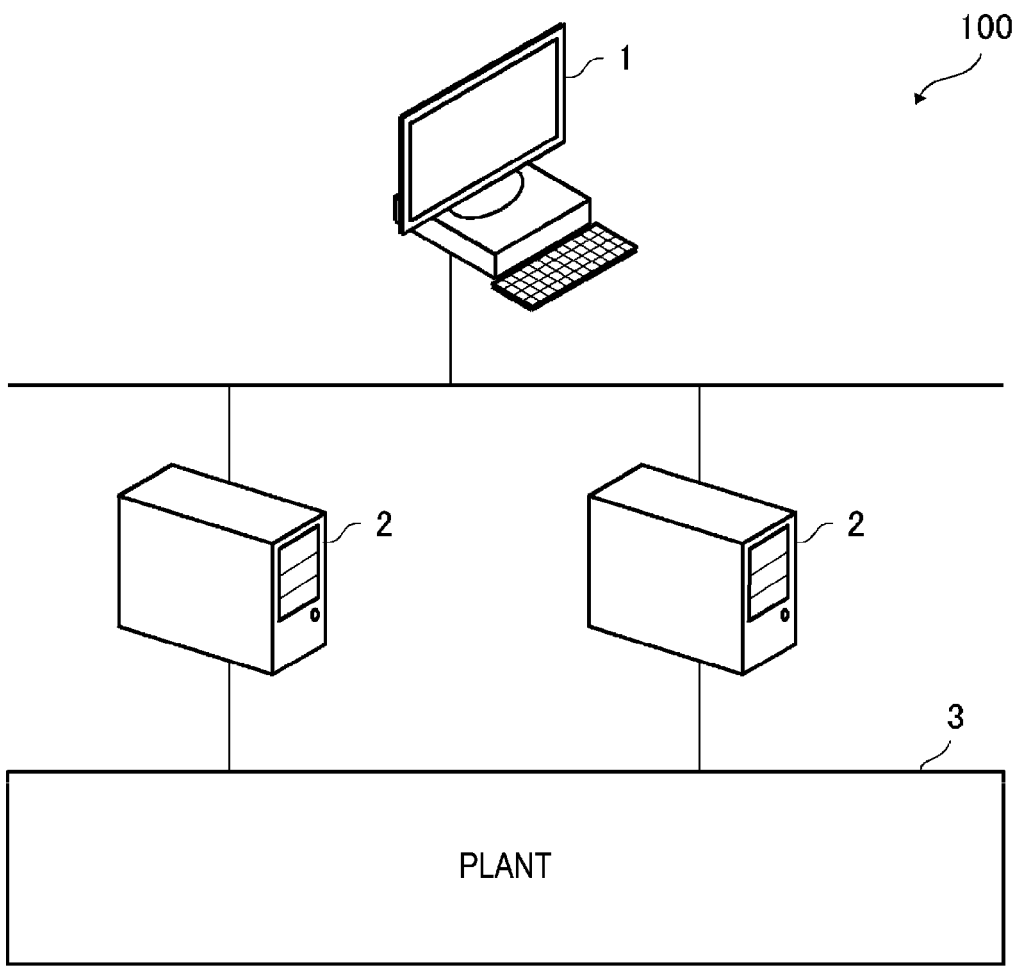
FIG. 1 is a diagram illustrating an example of a system according to an embodiment.

FIG. 1 is diagram, illustrating an example of a system according to the present embodiment. A system 100 includes a prediction apparatus 1, control stations 2, and a plant 3. The system 100 is, for example, a distributed control system (DCS) and includes a plurality of the control stations 2. That is, a control system of the plant 3 is divided into a plurality of sections, and the control sections are distributedly controlled by the control stations 2, respectively. The control station 2 is an existing facility in the DCS, receives state signals output from sensors or the like included in the plant 3, or outputs a control signal to the plant 3. On the basis of the control signal, actuators such as valves and other equipment included in the plant 3 are controlled.

The prediction apparatus 1 acquires the state signal (process data) of the plant 3 via the control stations 2. The process data includes the temperature, pressure, flow rate, and the like of a processing target that is a raw material or an intermediate product, and setting values for determining the operating conditions of the equipment included in the plant 3. Furthermore, the prediction apparatus 1 generates a prediction model based on a knowledge base that stores a correspondence relationship between an assumed cause and an influence appearing as an abnormality, for example. For example, the prediction apparatus 1 generates a prediction equation of quality and cost by using causality information that defines a combination of process data used as an explanatory variable (also referred to as a factor system) and process data used as a response variable (also referred to as an influence system), which is generated on the basis of a knowledge base. Then, by using the prediction equation and the process data, the prediction apparatus 1 can predict a characteristic value representing the quality and the like of a product, or predict the characteristic value of the product when the operating conditions of the plant 3 are changed. Furthermore, the prediction apparatus 1 may obtain an operating condition in which, for example, quality and cost satisfy a predetermined condition. Furthermore, by using the prediction equation and the process data, the prediction apparatus 1 may obtain operating conditions for shifting to a steady state in response to a change in the state appearing as an influence, or obtain operating conditions in which the product satisfies a predetermined requirement. Furthermore, the prediction apparatus 1 may use an analysis value obtained in a predetermined stage inspection as a response variable, instead of the process data of the influence system.

Figure 2:
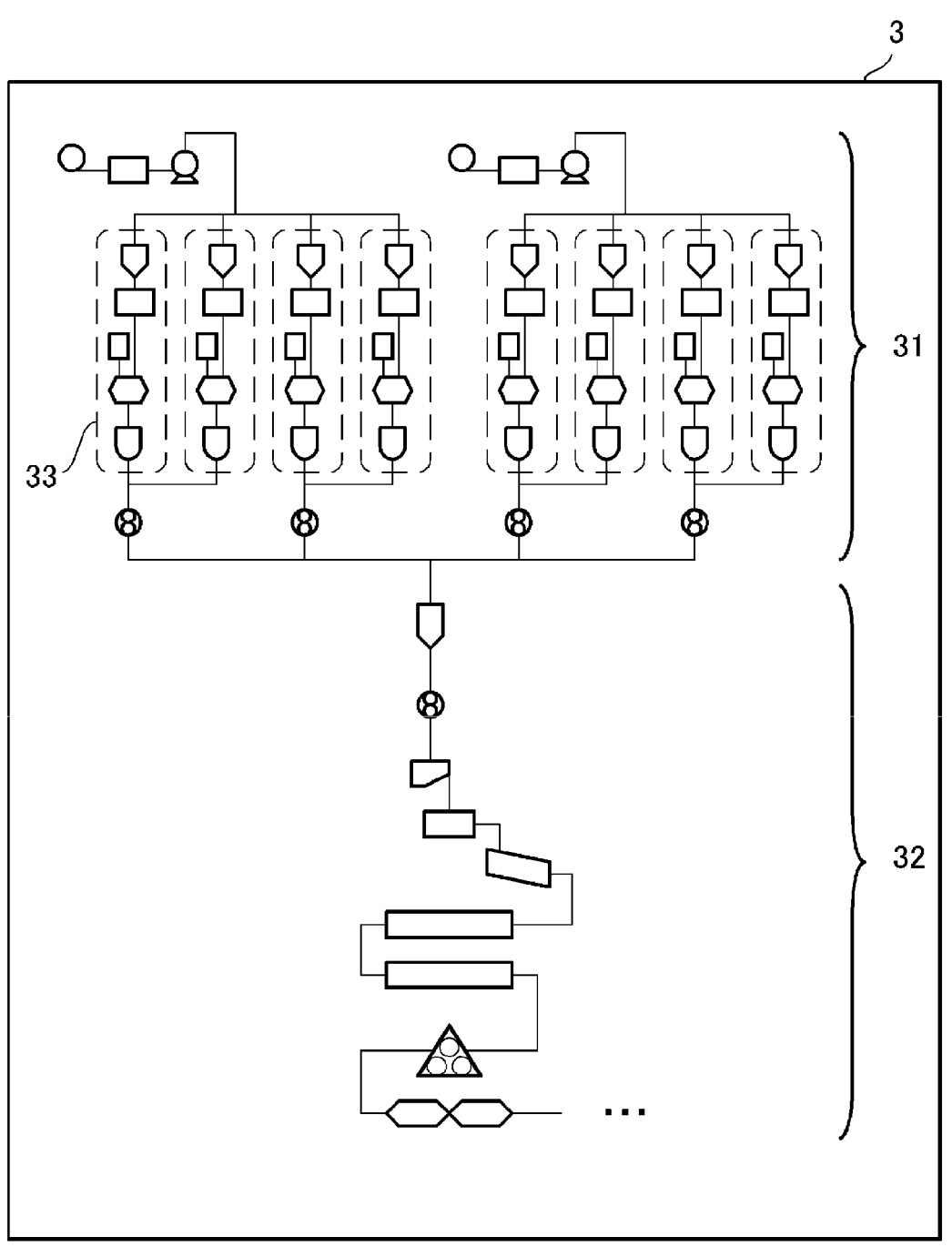
FIG. 2 is a schematic diagram illustrating an example of a process performed by equipment included in a plant.

FIG. 2 is a schematic diagram illustrating an example of the equipment included in the plant or a process performed by the equipment. That is, it is assumed that the process includes a production process that is processing and a process equipment that is an apparatus. In the present embodiment, the process may include a batch stage 31 and a continuous stage 32. In the batch stage 31, a processing target is sequentially processed on a transaction-to-transaction basis using a predetermined transaction, and for example, processing such as receiving, holding, and discharging of a raw material with respect to each equipment is performed in order. In the continuous stage 32, a successively introduced processing target is continuously processed, and for example, processing such as receiving, holding, and discharging of a raw material is performed in parallel. Furthermore, the process may include a plurality of sequences 33 that perform the same processing in parallel.

The equipment for performing each processing includes, for example, a reactor, a distillation apparatus, a heat exchanger, a compressor, a pump, a tank, and the like, and these are connected via pipes. Furthermore, sensors, valves, and the like are provided at predetermined positions of the equipment and the pipe. The sensor may include a thermometer, a flow meter, a pressure gauge, a level meter, a densitometer, and the like. Furthermore, the sensor monitors the operating state of each equipment and outputs a state signal. Furthermore, it is assumed that the sensor included in the plant 3 is attached with a "tag" which is identification information for identifying each of the sensors. The prediction apparatus 1 and the control station 2 manage input/output signals to each equipment on the basis of the tags.

Batch Stage

Figure 3:
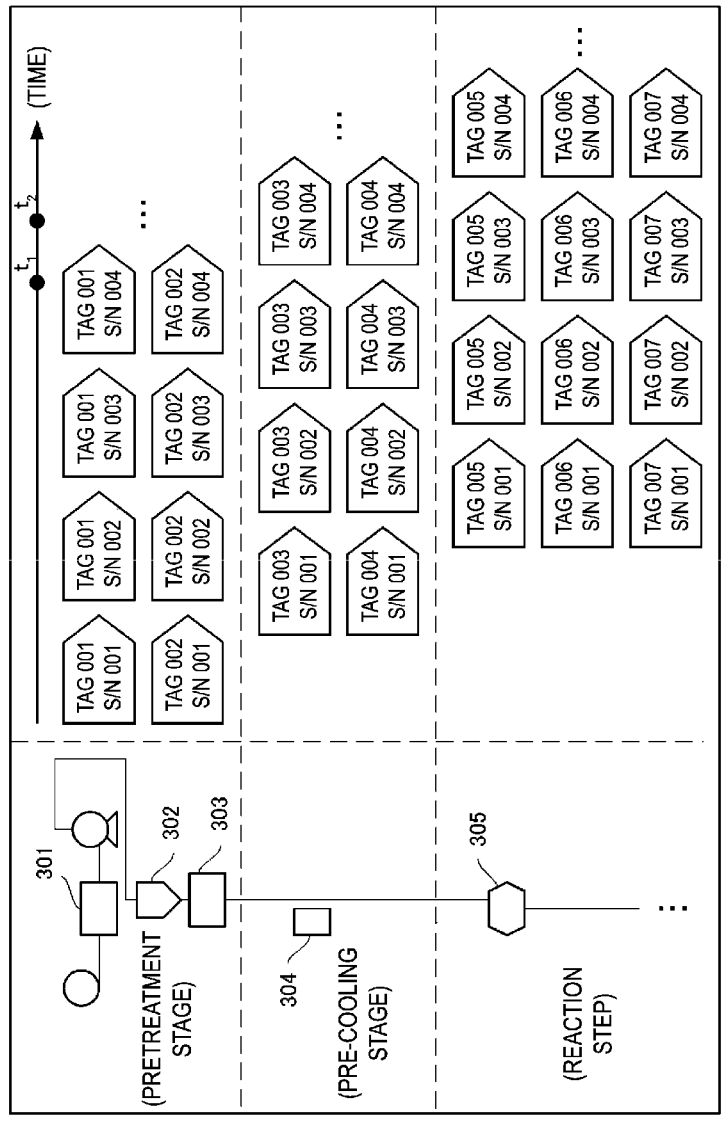
FIG. 3 is a diagram for explaining an example of process data in a batch stage.

FIG. 3 is a diagram for explaining an example of process data in the batch stage. The left column of FIG. 3 indicates a part of the process of the batch stage 31 illustrated in FIG. 2. Specifically, the process includes a shredder 301, a cyclone 302, a pretreatment 303, a pre-cooler 304, and a reactor 305. Furthermore, the process is classified into a pretreatment stage, a pre-cooling stage, and a reaction stage. The right column of FIG. 3 indicates an example of process data acquired in each process. In the pretreatment stage, time-series data are acquired from sensors with tags of 001 and 002. In the pre-cooling stage, time-series data are acquired from sensors with tags of 003 and 004. In the reaction stage, time-series data are acquired from sensors with tags of 005, 006, and 007. Furthermore, in the batch stage, a processing target correlated with a production serial number (also referred to as a "S/N") is intermittently processed. That is, the production serial number is identification information for identifying a processing target to be collectively processed in the batch stage. As illustrated in FIG. 3, time-series data related to a processing target correlated with a subsequent production serial number is obtained over time. Note that time points $t_1$ and $t_2$ are described below.

FIG. 4 is a diagram illustrating an example of information pre-registered in a knowledge base. The knowledge base is assumed to be stored in advance in a storage device of the prediction apparatus 1. The table of FIG. 4 includes a column corresponding to each of the sensors and a row indicating the cause of a change in an output value of each sensor. That is, values are registered in columns corresponding to the sensors affected by the causes such as "increase in the amount of secondary raw material A" and "decrease in the amount of secondary raw material A". The values are registered with a positive or negative sign corresponding to a variation in the output values of the sensors. Note that the combination of a cause and an influence is not limited to one-to-one. That is, a plurality of causes may be correlated with one influence, and the same cause may be associated with a plurality of influences.

It is assumed that the knowledge base is generated in advance by a user on the basis of, for example, hazard and operability study (HAZOP). The HAZOP relates to, for example, detection means at a monitoring point by an instrumentation equipment constituting a plant, a management range (upper and lower limit thresholds, which are alarm setting points), a deviation from the management range (abnormality and modulation), a list of assumed causes of the deviation from the management range, a logic (detection means) that determines which assumed cause caused the deviation, an influence of the deviation, measures to be taken when the deviation has occurred, and an action for the measures, and is a method of associating and comprehensively enumerating them. Note that in addition to the HAZOP, the knowledge base may be generated on the basis of fault tree analysis (FTA), failure model and effect analysis (FMEA), event tree analysis (ETA), a method based on them, a method similar to them, contents extracted from results of hearings with operators, or contents extracted from work standards and technical standards.

FIG. 5 is a diagram illustrating an example of a tag attribute table of a batch stage, which is generated on the basis of a knowledge base. The tag attribute table defines a method of processing data obtained from a sensor corresponding to each tag. Note that the tag attribute table may be a so-called database table, or may be a file having a predetermined format such as comma separated values (CSV). Furthermore, the tag attribute table is generated by a user in advance and read by the prediction apparatus 1.

The tag attribute table includes attributes of tag, sequence, product type, primary processing, smoothing, and operating condition optimization. In the field of tag, a tag that is sensor identification information is registered. In the field of sequence, identification information for identifying the sequence of a process is registered. In the field of product type, the type of a processing target is registered. In prediction processing, the prediction apparatus 1 may set parameters corresponding to, for example, the type of a processing target. In the field of primary processing, information indicating a processing method of an output value of a sensor is registered. Furthermore, attributes of the primary processing further include attributes of batch stage, method, and data interval. In the field of batch stage, identification information indicating subdivided stages in the batch stage is registered. In the field of method, information indicating the type of data processing method is registered. The type includes an "instantaneous value", "average", "integral", "differential", "difference", "maximum", "minimum", "thermal history", and "none". The "instantaneous value" represents a value at the start or end specified in a data interval. The "average" represents an average value obtained by dividing the value of a period specified in the data interval by the number of data. The "integral" represents a total value of values for the period specified in the data interval. The "differential" represents a differential coefficient at the start or end specified in the data interval. The "difference" represents the difference between values at the start and end specified in the data interval. The "maximum" represents a maximum value within the period specified in the data interval. The "minimum" represents a minimum value within the period specified in the data interval. The "thermal history" is an example of the degree of reaction progress, and represents, for example, an integral value of a reaction rate in the period specified in the data interval. The "none" is attached to a tag at the end of the batch and represents that no processing process is performed. The attributes of the data interval further include attributes of start and end. In at least one of the fields of the start and end, information indicating the timing of acquiring a sensor output value is registered. The information indicating the timing may be defined on the basis of a predetermined step predetermined for each of the subdivided stages, for example. In the field of smoothing, information indicating the necessity of performing predetermined smoothing on data is registered. The attributes of the operating condition optimization further include attributes of adjust/monitor, cost impact, management range, and setting range. In the field of adjust/monitor, a type indicating whether a processing target is an adjustment target or a monitoring target in optimization processing is registered. In the field of cost impact, the cost per predetermined unit affected at the time of adjustment in the optimization processing is adjusted. The attributes of the management range further include attributes of upper limit and lower limit. In the field of upper limit and lower limit, information indicating an allowable range of a sensor output value is registered. The attributes of the setting range further include attributes of upper limit and lower limit, and in the field of upper limit and lower limit, information indicating a target range of a sensor output value. According to the information registered in the field of operating condition optimization as described above, the prediction apparatus 1 may perform multi-objective optimization or single-objective optimization.

FIG. 6 is a diagram illustrating an example of a tag combination table, which is generated on the basis of a knowledge base. The tag combination table is information representing the causality obtained from the knowledge base, and defines a combination of process data used as an explanatory variable and process data used as a response variable. The tag combination table may also be a so-called database table, or may also be a file having a predetermined format such as CSV. Furthermore, the tag combination table is also generated by a user in advance and read by the prediction apparatus 1.

The tag combination table includes attributes of combination ID, tag, factor/influence, causality, learning period, and dependency. In the field of combination ID, identification information indicating the summary of causality is registered. In the field of tag, a tag that is sensor identification information is registered. In the field of factor/influence, a type indicating whether causality is a factor system or an influence system (in other words, whether it is an explanatory variable or a response variable) is registered. In the field of causality, a positive or negative type is registered. The positive or negative type indicates restriction of a code that needs to vary an output value of the factor system corresponding to a tag in question. A value of the influence system is varied in a positive or negative direction according to the restriction. Accordingly, a causality value is registered in a record having "factor" registered in the field of factor/influence. In the present embodiment, the prediction apparatus 1 generates a prediction model by imposing a restriction (called "code restriction") having a certain correspondence relationship between the positive/negative variation direction of a value of the factor system, and the positive/negative variation direction of a value of the influence system. For example, a prediction model is generated to determine the positive/negative variation direction of the response variable in accordance with the positive/negative variation direction of the explanatory variable. That is, the code registered in the field of causality indicates a positive or negative direction in which a sensor output value corresponding to a tag of the record needs to be varied. The value of the influence system is varied in a predetermined positive or negative direction according to the code registered in the field of causality. Furthermore, in the field of learning period, information for identifying the period of process data used for generating a prediction model is registered. The information may be, for example, the number of most recent production serial numbers.

Figure 7:
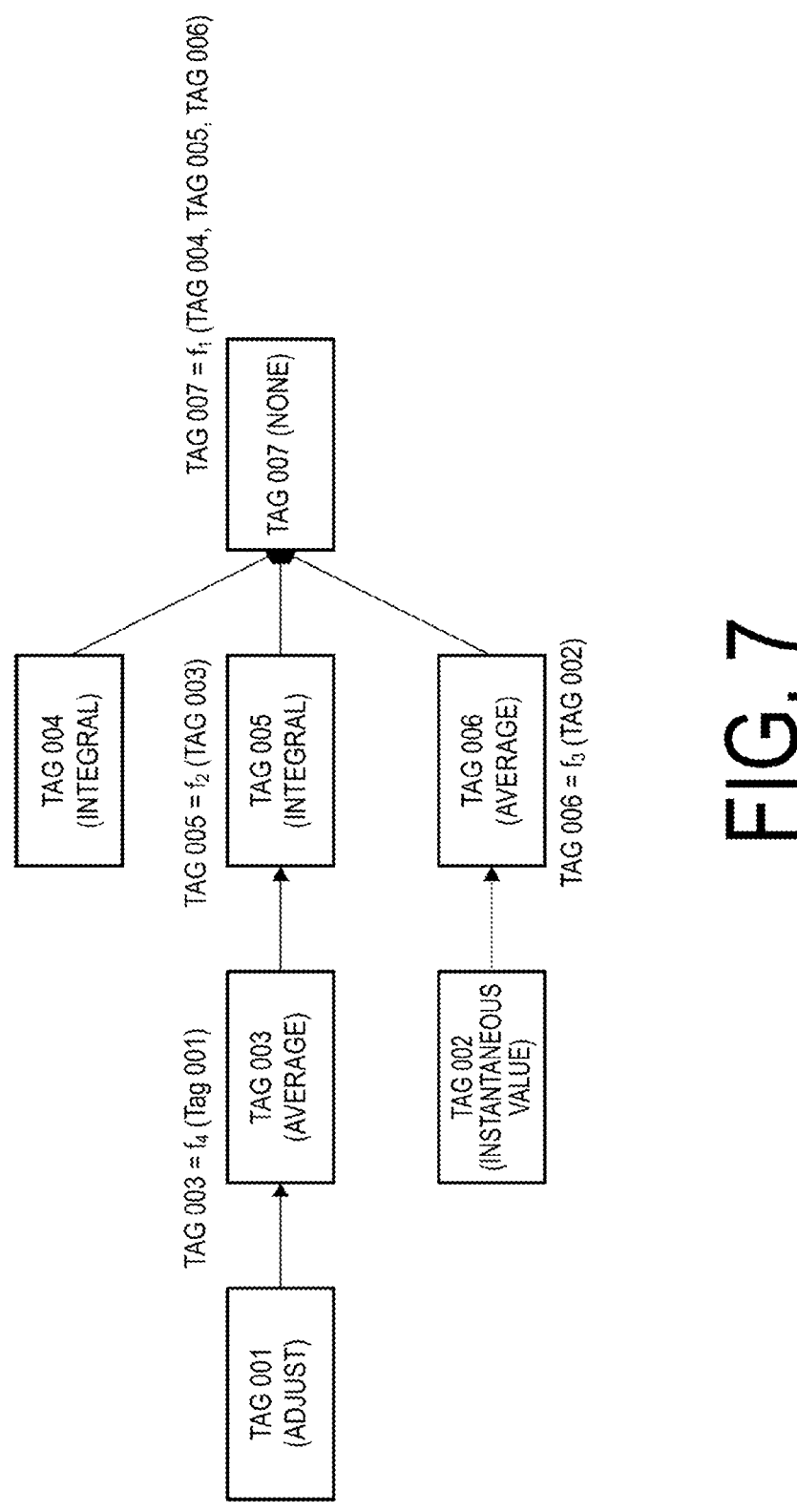
FIG. 7 is a diagram illustrating an example of a logic tree illustrating the configuration of a prediction model.

On the basis of the tag attribute table and the tag combination table as described above, the prediction apparatus 1 generates a prediction model. FIG. 7 is a diagram illustrating an example of a logic tree illustrating the configuration of a prediction model. Each rectangle represents an output value or a predicted value of a sensor corresponding to a tag. The prediction model includes a prediction equation for predicting an output value of a sensor, which is connected by an arrow and corresponds to an influence system, on the basis of an output value of a sensor in an upstream (left in FIG. 7) stage. Furthermore, the prediction model has a hierarchical structure including a plurality of prediction equations, and includes another prediction equation including a prediction value by a prediction equation as an explanatory variable. The prediction equation is generated by combining records with the same combination ID in the tag combination table illustrated in FIG. 6. For example, a predetermined prediction equation is generated by using, as an explanatory variable, an output value of a sensor corresponding to a tag with "factor" registered in the field of factor/influence or the predicted value thereof, and using, as a response variable, an output value of a sensor corresponding to a tag with "influence" registered in the field of factor/influence or a characteristic value of a product that is an analysis value obtained by, for example, stage inspection.

Specifically, the prediction equation can be expressed by, for example, Equation (1) below.

$$Y(t)=a_1(t)x_1(t)+a_2(t)\cdot x_2(t)+ \ldots +a_n(t)\cdot x_n(t)+a_{ar}(t)\cdot Y(t-1)+C \tag{1}$$

Here, t denotes a value corresponding to a production serial number, $Y(t)$ denotes a predicted value of an influence system, $x(t)$ denotes an output value of a sensor of a factor system or a predicted value thereof, $a(t)$ denotes a coefficient of the factor system, $a_{ar}(t)$ denotes a coefficient of an autoregressive term, and C denotes a constant term. The number of the terms corresponding to the factor system that are included in the prediction equation is as same as the number of output values of an original sensor connected by the arrow in FIG. 7. Furthermore, the autoregressive term is a predicted value or a measured value for the past production serial number. The number of autoregressive terms is not limited to one, and the prediction equation may include autoregressive terms related to a plurality of most recent production serial numbers.

Furthermore, the prediction apparatus 1 performs a learning process for each production serial number in the batch stage, and updates the coefficient or the like of the prediction equation. For example, the coefficient is determined by performing regression analysis using, as learning data, process data corresponding to a predetermined number of most recent production serial numbers, which are set in the field of learning period of FIG. 6. At this time, it is assumed that the coefficient is determined and the code restriction described above is satisfied according to the determined coefficient.

Continuous Stage

Figure 8:
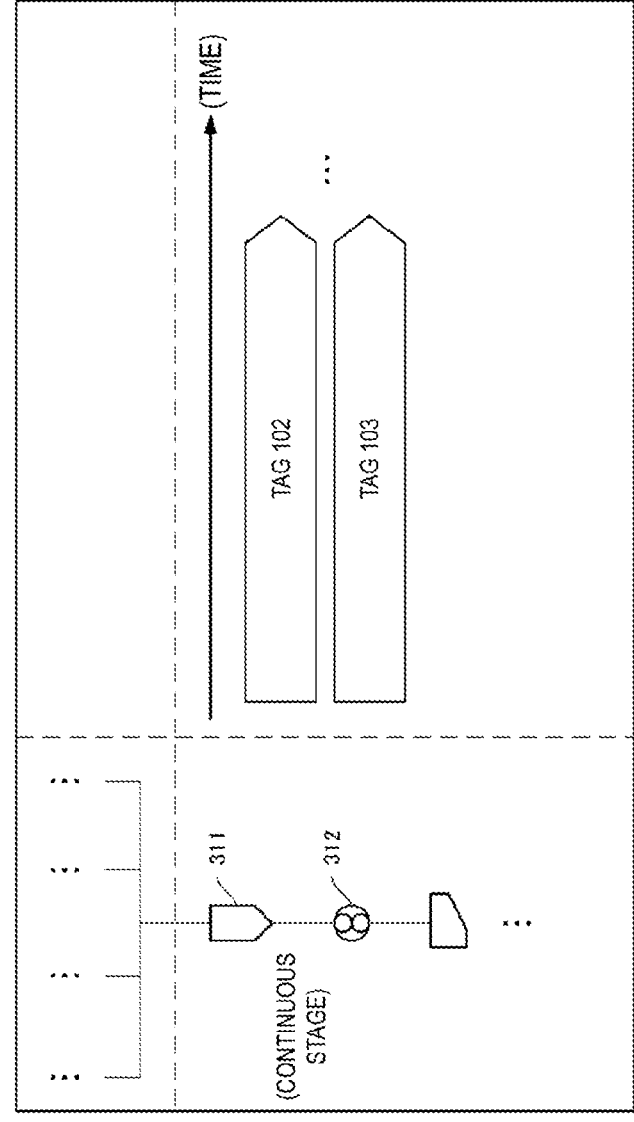
FIG. 8 is a diagram for explaining an example of process data in a continuous stage.

FIG. 8 is a diagram for explaining an example of process data in the continuous stage. The left column of FIG. 8 indicates a part of the process of continuous stage 32 illustrated in FIG. 2. Specifically, the process includes a tank 311 and a pump 312. The right column of FIG. 8 indicates an example of process data obtained in each process. In the continuous stage 32, time-series data correlated with tags and not correlated with production serial numbers is continuously acquired from sensors. In the example of FIG. 8, time-series data are acquired from sensors with tags of 102 and 103. In the continuous stage, the equipment continuously receives a processing target and continuously performs processing. When the continuous stage is performed after the batch stage, the present embodiment uses traceability information set in advance by a user to associate a processing target in the batch stage with a processing target in the continuous stage. The traceability information includes a sampling interval and a residence time. The sampling interval represents an interval for performing sampling for stage inspection by, for example, a sample size reduction method in the continuous stage. The residence time represents the time for which a processing target stays until the process included in the continuous stage is reached from the completion of the batch stage.

Figure 9:
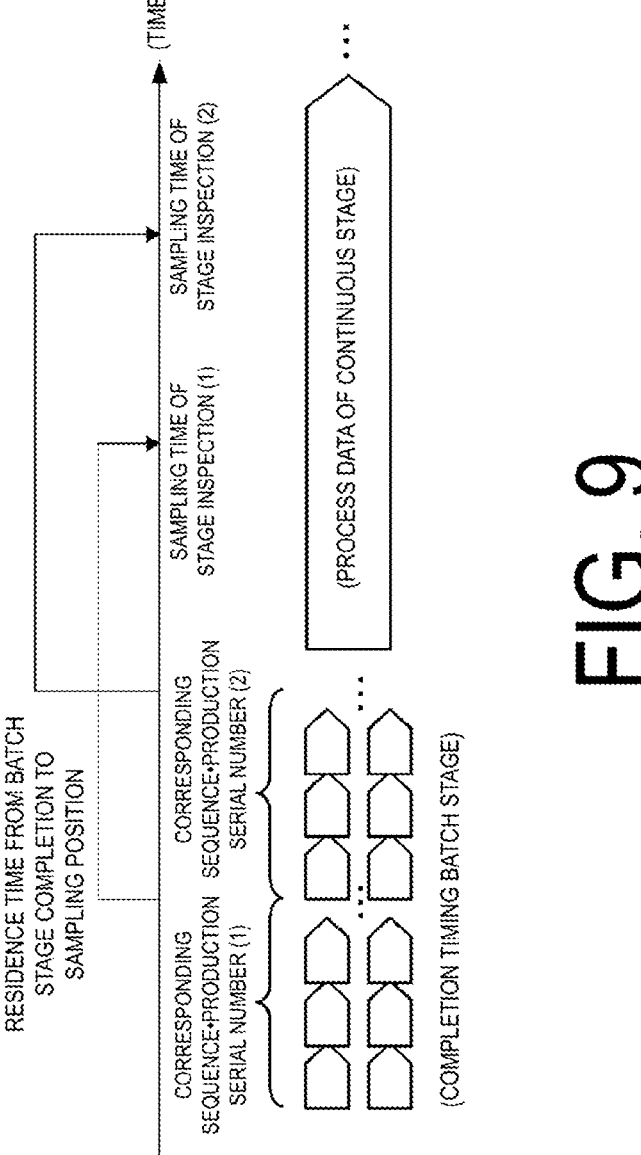
FIG. 9 is a diagram for explaining correlation between a sample in stage inspection of a continuous stage and a production serial number in a batch stage.

FIG. 9 is a diagram for explaining correlation between a sample in the stage inspection of the continuous stage and the production serial number in the batch stage. For example, it is assumed that the stage inspection is performed at predetermined intervals, and the sample in the stage inspection is a size-reduced sample for a period corresponding to the interval. Furthermore, when the continuous stage is performed after the batch stage, a product by the batch stage completed in a predetermined period is introduced as a processing target in the continuous stage. Accordingly, the size-reduced sample of process data in the continuous stage is associated with the range of the completion time of the batch stage by tracing back the residence time up to the sampling time point, and a production serial number group of the corresponding batch stage can be identified. By such association, when the batch stage and the continuous stage are continuously performed, the accuracy of a prediction equation using process data in the batch stage can be improved.

Figure 10:
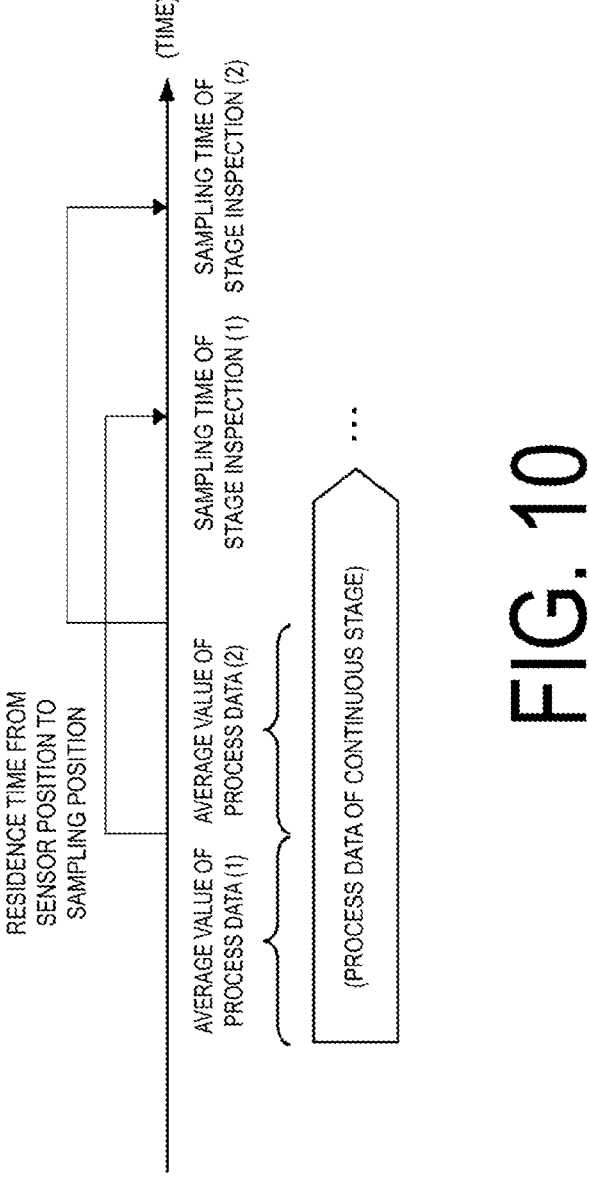
FIG. 10 is a diagram for explaining a residence time from a sensor position in a continuous stage to a sampling position in stage inspection.

FIG. 10 is a diagram for explaining a residence time from a sensor position in the continuous stage to a sampling position in the stage inspection. The size-reduced sample described above is calculated as, for example, an average value of process data obtained in the continuous stage for a predetermined period. In the present embodiment, the residence time is set in an interval between the position of a sensor that outputs the process data in the continuous stage and the position of sampling for the stage inspection. This enables correlation of the sampling time when this calculation is performed with the range of the acquisition time of process data to be averaged at that time. This makes it possible to associate the process data in the continuous stage with the size-reduced sample of the stage inspection. By such association, the accuracy of a prediction equation using the process data in the continuous stage can be improved.

FIG. 11 is a diagram illustrating an example of a tag attribute table of the continuous stage, which is generated on the basis of a knowledge base. The tag attribute table of the continuous stage may also be a so-called database table, or may also be a file having a predetermined format such as CSV. Furthermore, the tag attribute table is generated by a user in advance and read by the prediction apparatus 1.

The tag attribute table of the continuous stage includes attributes of tag, type, residence time, batch-related tag, and operating condition optimization. Note that a description is omitted for attributes having the same name as that of the tag attribute table of the batch stage illustrated in FIG. 5. In the field of type, a type selected from the group including continuous, batch and quality is registered. In the type, "continuous" represents that a tag indicated by each record is process data in the continuous stage. "Batch" represents process data in the batch stage. "Quality" represents an analysis value of a size-reduced sample in the stage inspection.

Figure 12:
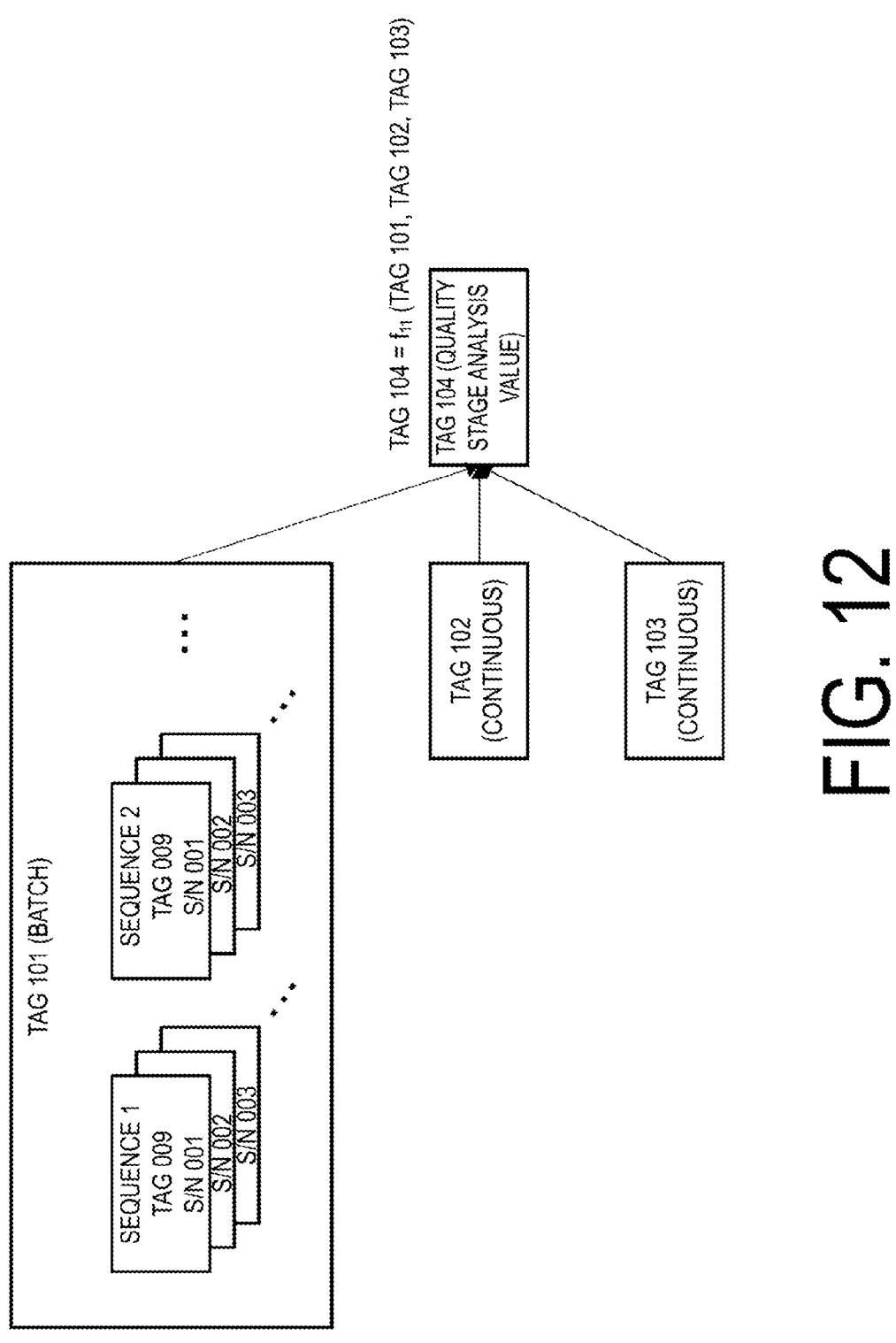
FIG. 12 is a diagram illustrating an example of a logic tree illustrating the configuration of a prediction model.

Furthermore, also in the continuous stage, the tag combination table as illustrated in FIG. 6 is used, and the prediction apparatus 1 generates a prediction model on the basis of the tag attribute table and the tag combination table. FIG. 12 is a diagram illustrating an example of a logic tree illustrating the configuration of the prediction model. Also in FIG. 12, each rectangle represents an output value or a predicted value of a sensor corresponding to a tag. A rectangle with a tag 101 indicates process data of the batch stage. As described with reference to FIG. 9, in the process data of the batch stage, corresponding production serial numbers and sequences are identified on the basis of the residence time, and an average value thereof is used as an explanatory variable of a prediction equation. Rectangles with tags 102 and 103 indicate the process data of the continuous stage. As described with reference to FIG. 10, in the process data of the continuous stage, a corresponding period is identified on the basis of the residence time and the sampling interval, and an average value of the process data within the period is used as an explanatory variable of a prediction equation. A rectangle with a tag 104 is an analysis value of the stage inspection (also referred to as a quality stage), and is a value corresponding to process data obtained by the sample size reduction method, for example. Also in the continuous stage, the prediction equation is generated by combining records with the same combination ID in the tag combination table illustrated in FIG. 6. Since the prediction equation is the same as that in the batch stage, a description thereof is omitted.

In the present embodiment, since process data selected on the basis of the knowledge base is used, a prediction model can be generated at high speed from parameters whose causality is clear without requiring enormous parameters of the entire plant. Furthermore, when a prediction model including an autoregressive term is generated, it becomes possible to make a prediction that takes into account changes over time in process data, which are not reflected by simply performing a simulation from process data at a certain time point.

Furthermore, without code restriction as described above, an appropriate result for an inverse problem may not be obtained using a prediction model. In other words, even when the required quality is specified and operating conditions corresponding to the required quality are obtained, a prediction model that outputs results contrary to the principle of a process may be generated. By imposing the code restriction as described above, it is possible to generate a prediction model according to the principle of the process.

That is, by using a prediction equation satisfying the code restriction, not only it is possible to predict a value of an influence system that is an alternative index of the quality of a product, but also it is easy to know how to change the operating conditions of the plant to improve quality.

Control

The prediction apparatus 1 may use the generated prediction equation and process data to obtain operating conditions for shifting to a steady state in response to a change in the state appearing as an influence or to obtain operating conditions in which a product satisfies a predetermined requirement, thereby controlling the plant 3 on the basis of the operating conditions. For example, the prediction apparatus 1 determines a target value for some characteristic values, determines an allowable range for other controllable process data, and obtains preferred operating conditions. Moreover, the prediction apparatus 1 may set a unit price for at least some of the process data, and obtain, for example, operating conditions that minimize the cost or operating conditions that satisfy the allowable range of the cost.

As described above, the allowable range of each process data is set in the field of "management range" in the table illustrated in FIG. 5. In the field of "setting range", the target value of each process data is set. In the field of "cost impact (unit price)", the cost per predetermined unit amount of each process data is set. Note that process data in which "adjust" is registered in the field of "adjust/monitor" represents a value that can be adjusted by controlling an actuator or the like included in the plant 3. At the time of control, the operating conditions of adjustable process data are obtained on the basis of, for example, conditions such as a target and an allowable range.

In the example of FIG. 5, the cost can be obtained from the sum of products of the unit prices set in the field of "cost impact (unit price)" and the values of the process data corresponding to respective tags. Then, the value (operating condition) of controllable process data is calculated, and the calculated value of the process data minimizes the cost as an objective function.

Furthermore, a constraint condition is imposed, and a predicted value calculated by the prediction equation on the basis of the setting range falls within the range registered in the "setting range" in FIG. 5 under the constraint condition. These process data are, for example, qualities or quality alternative indices, and the range can be said to be a target value determined by the required specifications.

Moreover, possible values of the controllable process data are limited on the basis of the management range. Process data corresponding to the tag in which "adjust" is registered in the field of "adjust/monitor" can be adjusted, but constraint conditions are set due to setting limits determined in accordance with, for example, the specification and the like of the plant 3.

Furthermore, in the present embodiment, the prediction model generated in the prediction processing is also used for the constraint conditions. That is, a constraint condition representing a predetermined range is set for at least some of the response variables in a prediction equation, and an optimum value of an explanatory variable that makes a predicted value within the range of the constraint condition is searched for.

When a value that minimizes an objective function is obtained among variables satisfying linear inequalities and linear equations that are constraint conditions, it can be optimized by a so-called linear planning method. Note that a prediction value of process data may be used as a response variable, instead of the cost. At this time, an allowable range may be determined for the cost. Furthermore, even though the constraint condition or the objective function contains a non-linear part, it can be solved by the existing non-linear planning method. Furthermore, a plurality of objective functions may be set and multi-objective optimization may be performed. As described above, operating conditions can be obtained by solving an optimization problem.

For example, when process data to be adjusted is the input amount of a secondary raw material, a calculated optimum solution becomes a set value as is. For example, when process data to be adjusted is an integral value of the temperature to be processed, an actuator such as a valve is adjusted and the calculated optimum solution is approached.

Apparatus Configuration

Figure 13:
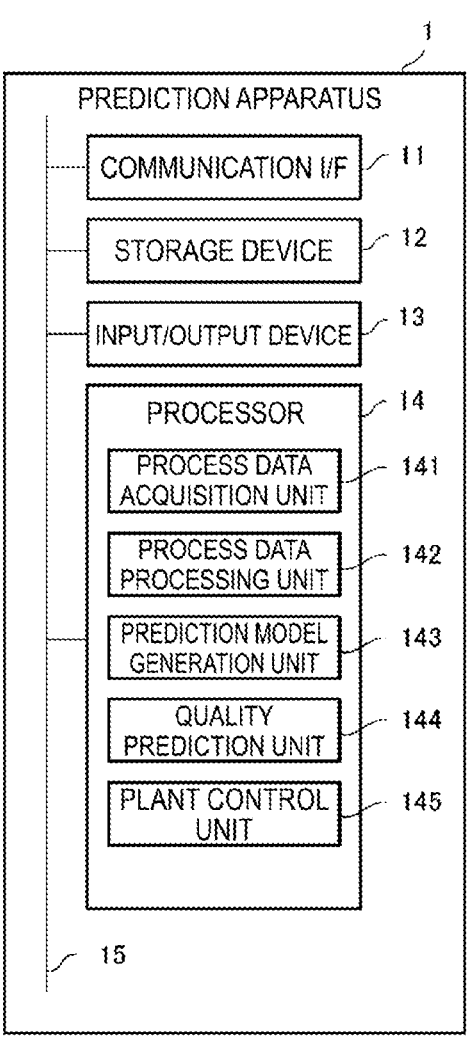
FIG. 13 is a block diagram illustrating an example of the configuration of a prediction apparatus.

FIG. 13 is a block diagram illustrating an example of the configuration of the prediction apparatus 1. The prediction apparatus 1 is a general computer, and includes a communication interface (I/F) 11, a storage device 12, an input/output device 13, and a processor 14. The communication I/F 11 may be, for example, a network card or a communication module, and communicates with another computer on the basis of a predetermined protocol. The storage device 12 may be a main storage device such as a random access memory (RAM) or a read only memory (ROM), and an auxiliary storage device (secondary storage device) such as a hard-disk drive (HDD), a solid state drive (SSD), and a flash memory. The main storage device temporarily stores a program to be read by the processor 14 and information transmitted to and received from other computers, and secures a work area of the processor 14. The auxiliary storage device stores a program executed by the processor 14 and information and the like transmitted to and received from other computers. The input/output apparatus 13 is, for example, a user interface such as an input device such as a keyboard and a mouse, an output device such as a monitor, and an input/output device such as a touch panel. The processor 14 is an arithmetic processing device such as a central processing unit (CPU), and performs each processing according to the present embodiment by executing the program. In the example of FIG. 13, a functional block is illustrated in the processor 14. That is, by executing a predetermined program, the processor 14 functions as a process data acquisition unit 141, a process data processing unit 142, a prediction model generation unit 143, a quality prediction unit 144, and a plant control unit 145.

The process data acquisition unit 141 acquires process data from the sensors included in the plant 3 via the communication I/F 11 and the control station 2, and stores the process data in the storage device 12. As described above, the process data is correlated with the sensor by the tag.

The process data processing unit 142 processes the process data on the basis of the tag attribute table of the batch stage illustrated in FIG. 5 or the tag attribute table of the continuous stage illustrated in FIG. 11 when a prediction model is generated. In other words, the process data processing unit 142 extracts an instantaneous value of the specified timing, calculates an average value of the specified period, or calculates an integral value of the specified period on the basis of the information registered in the field of primary stage in the tag attribute table of the batch stage. Furthermore, on the basis of the information registered in the field of batch-related tag in the tag attribute table of the continuous stage and, for example, the aforementioned traceability information previously stored in the storage device 12, the process data processing unit 142 may calculate an average value of process data corresponding to a predetermined tag, system, and production serial number, or an average value of the period, which is identified on the basis of the traceability information, with respect to the process data of the continuous stage.

The prediction model generation unit 143 generates a prediction model including the prediction equation as expressed by Equation (1) described above on the basis of, for example, the tag combination table illustrated in FIG. 6, and stores the prediction model in the storage device 12. The prediction model generation unit 143 may update the coefficients and the like of the prediction equation by using data of a most recent predetermined period for each production serial number in the batch stage, for example. Furthermore, the prediction model generation unit 143 may update the coefficients and the like of the prediction equation by using most recent data for each predetermined period in the continuous stage, for example.

The quality prediction unit 144 predicts an output value of a predetermined sensor and an analysis value of stage inspection by using the process data and the prediction model. Note that the quality prediction unit 144 may use data based on arbitrary operating conditions and the prediction model and calculate a predicted value after the operating conditions are changed.

The plant control unit 145 controls the actuators such as valves and other equipment included in the plant 3 via, for example, the communication I/F 11 and the control station 2. Furthermore, the plant control unit 145 may obtain operating conditions in which quality and cost satisfy predetermined conditions, and may control the plant 3 on the basis of the operating conditions. Furthermore, the plant control unit 145 may obtain, for example, operating conditions for shifting to a predetermined steady state or obtain operating conditions in which a product satisfies a predetermined requirement, and may control the plant 3 on the basis of the operating conditions.

The above components are connected via a bus 15.

Prediction Processing (Batch Stage)

Figure 14:
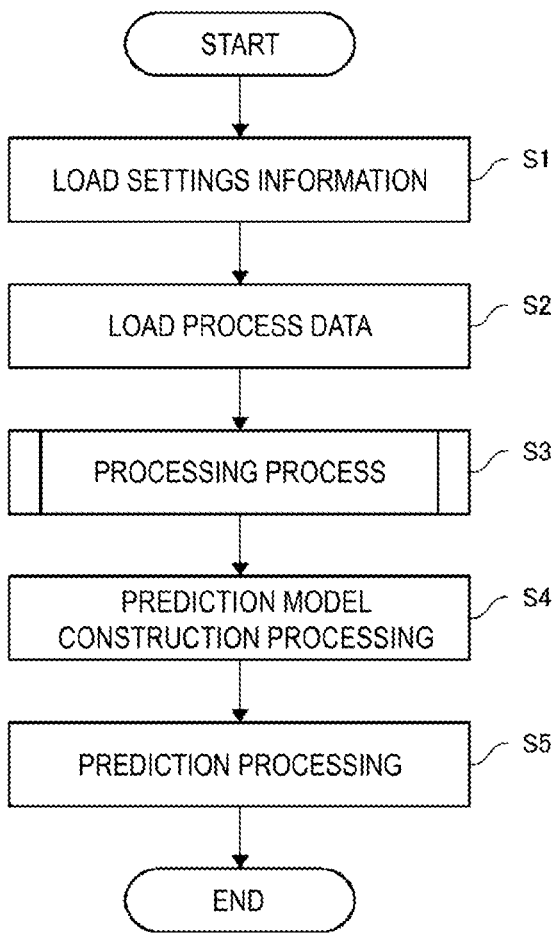
FIG. 14 is a processing flow chart illustrating an example of prediction processing performed by a prediction apparatus.

FIG. 14 is a processing flow chart illustrating an example of prediction processing performed by the prediction apparatus 1. The processor 14 of the prediction apparatus 1 performs the processing as illustrated in FIG. 14 by executing a predetermined program. In the batch stage, the prediction processing is performed for each production serial number. In the continuous stage, the prediction processing is performed at a predetermined sampling interval. It is assumed that the tag attribute table of the batch stage illustrated in FIG. 5, the tag combination table illustrated in FIG. 6, the tag attribute table of the continuous stage illustrated in FIG. 11, the traceability information, and the like are generated by a user, and are stored in advance in the storage device 12. Furthermore, it is assumed that the process data acquisition unit 141 continuously acquires process data from the sensors included in the plant 3 via, for example, the communication I/F 11 and the control station 2, and temporarily or permanently stores the acquired process data in the storage device 12. The process data is described according to, for example, a predetermined standard such as OPC.

The process data acquisition unit 141 of the prediction apparatus 1 loads setting information (FIG. 14: S1). In this step, the process data acquisition unit 141 reads the tag attribute table, the tag combination table, the traceability information, and the like from the storage device 12.

Furthermore, the process data acquisition unit 141 loads the process data (FIG. 14: S2). In this step, process data corresponding to tags used in a prediction equation is extracted, for example, for each prediction equation, for each sequence, and for each subdivided stage. FIG. 15 is a diagram illustrating an example of a writing array for the batch stage for writing data read in this step. The writing array for the batch stage may also be OPC data, may also be a so-called database table, or may also be a file having a predetermined format such as CSV. The table of FIG. 15 includes attributes of date and time, S/N, product type, step, and tag. In the field of date and time, the date and time when a sensor outputs a measured value is registered. In the field of S/N, a production serial number is registered. In the field of product type, the type of a processing target is registered. In the field of step, information indicating a phase in a corresponding stage, which is represented by a predefined step, is registered. In the field of tag, an output value of a sensor corresponding to each tag is registered.

Figure 16:
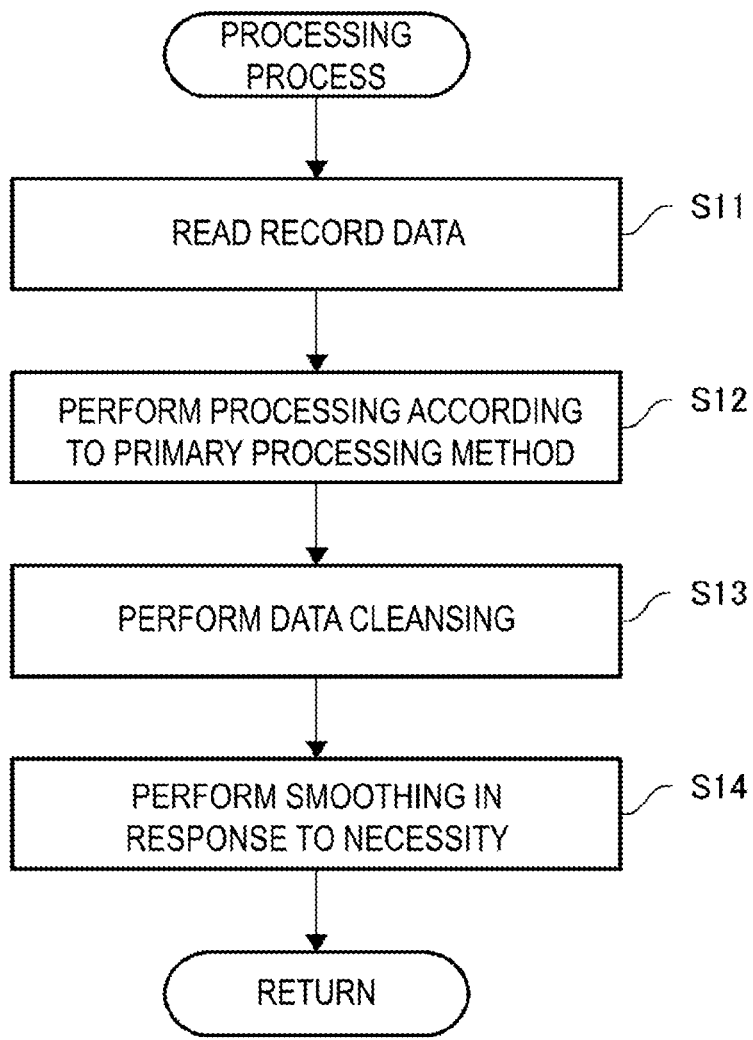
FIG. 16 is a processing flow chart illustrating an example of a processing process.

Furthermore, the process data processing unit 142 of the prediction apparatus 1 performs a predetermined processing process on the process data (FIG. 14: S3). Details of this step is described with reference to FIG. 16. FIG. 16 is a processing flow chart illustrating an example of the processing process. When the process data for each prediction equation, each sequence, and each subdivided stage is extracted in the writing array illustrated in FIG. 15, the process data processing unit 142 performs processing as illustrated in FIG. 16 on each record of the writing array.

The process data processing unit 142 reads the records from the writing array (FIG. 16: S11). In this step, one record is sequentially read from the table as illustrated in FIG. 15. Furthermore, the process data processing unit 142 processes data according to a primary processing method (FIG. 16: S12). In this step, on the basis of the type registered in the field of "method" of "primary processing" of a corresponding tag, for example, an instantaneous value, an average value, an integral value, a differential coefficient, a difference, a maximum value, a minimum value, thermal history, or process data itself is obtained by referring to the tag attribute table illustrated in FIG. 5. FIG. 17 is a diagram illustrating an example of a batch array for writing processing results of this step. The batch array may also be OPC data, may also be a so-called database table, or may also be a file having a predetermined format such as CSV. The table of FIG. 17 includes attributes of S/N, end date and time, and tag. In the field of S/N, a production serial number is registered. In the field of end date and time, the date and time when the batch stage of a corresponding S/N is completed is registered. In the field of tag, process data after the processing process is registered.

Hereinafter, calculation of the thermal history is described. The thermal history is information representing the degree of progress of reaction for, for example, a general chemical reaction such as depolymerization, acetylation, or deacetylation. In the present embodiment, an integral value of a reaction rate in a predetermined period is obtained to serve as the thermal history. For example, as expressed by Equation (2) below, the thermal history is calculated by the integral value of the reaction rate equation using the Arrhenius equation.

[Math. 1]

$$\int_{t_i}^{t_f} \frac{d[C(t)]}{dt} dt = \int_{t_i}^{t_f} A\exp\left(-\frac{E}{RT(t)}\right)[A(t)]^m[B(t)]^n dt \qquad (2)$$

In Equation (2) above, A denotes a frequency factor. E denotes activation energy. R denotes a gas constant. Furthermore, A(t) and B(t) denote concentration terms, and m and n denote reaction orders. These values are defined in accordance with reactions and objects. Furthermore, t denotes a step representing a predetermined interval in a stage. T(t) denotes the temperature in a corresponding step and is one type of process data. Such processing enables quality prediction to use the amount of heat received by a processing target in a predetermined period.

Furthermore, the process data processing unit 142 performs predetermined data cleansing (FIG. 16: S13). The data cleansing is a process for excluding an outlier, and various methods can be employed. For example, a moving average value is calculated using most recent data. Furthermore, the difference between the moving average value and a measured value is measured, and a standard deviation $\sigma$ (also referred to as error variance) representing a variation in the difference is obtained. Then, a value that does not fall within a predetermined confidence interval, such as an interval from the mean of the probability distribution $-3\sigma$ to the mean of the probability distribution $+3\sigma$ (also referred to as a $3\sigma$ interval), is excluded. Likewise, a value that does not fall within the $3\sigma$ interval may be excluded for the difference between measured values before and after. The data cleansing is performed on, for example, an instantaneous value or process data at the end of the batch.

Then, the process data processing unit 142 performs predetermined smoothing (FIG. 16: S14). The smoothing is performed on a tag in which "required" is registered in the field of smoothing in the tag attribute table illustrated in FIG. 5. Furthermore, the smoothing may be, for example, a process for obtaining a most recent predetermined number of moving averages for a value after the data cleansing, or may be another method capable of smoothing data. With the above, the processing process of FIG. 16 is ended, and the procedure returns to the processing of FIG. 14.

Thereafter, the prediction model generation unit 143 of the prediction apparatus 1 performs prediction model construction processing (FIG. 14: S4). In this step, the prediction model generation unit 143 generates a prediction equation constituting a prediction model on the basis of the tag combination table illustrated in FIG. 6. Specifically, the prediction model generation unit 143 reads the processed process data with the tags having the same combination ID, applies the processed process data to the prediction equation (for example, Equation (1) described above) on the basis of the type registered in the field of factor/influence, and determines the coefficient and the constant term of the prediction equation by regression analysis. At this time, the processed process data is intended to learn most recent data in accordance with the value registered in the field of learning period. Note that the prediction model generation unit 143 may also search for a preferred value for the magnitude of the learning period. For example, the prediction model generation unit 143 calculates a correlation coefficient by using the generated prediction model and process data, and sets a learning period for improving the correlation coefficient. Furthermore, on the basis of the code registered in the field of causality, the prediction model generation unit 143 determines the coefficient and the like of the prediction equation under the constraint that there is a certain correspondence relationship between the variation direction of the value of the factor system and the variation direction of the value of the influence system. Then, the prediction model generation unit 143 stores the generated prediction model in the storage device 12.

The quality prediction unit 144 of the prediction apparatus 1 performs prediction processing by using the prediction model generated in the prediction model construction processing, and the process data or the predicted value thereof (FIG. 14: S5). For convenience, the prediction processing is illustrated in the processing flow of FIG. 14, but the quality prediction unit 144 can perform the prediction processing by using the prediction model and the process data at any time point. In this step, the quality prediction unit 144 reads a most recent prediction model and process data, substitutes the process data or the predicted value thereof into the prediction equation included in the prediction model, and obtains a predicted value of a value corresponding to an influence system.

FIG. 18 is a diagram for explaining process data or the predicted value thereof to be substituted into a prediction equation. When the value of the tag 007 illustrated in FIG. 4 is predicted, measured values or predicted values of sensors corresponding to respective tags are used as illustrated in FIG. 18 at the time point $t_1$ in FIG. 3. That is, when the value of the tag 007 of the production serial number 003 is predicted, known measured values of the tags 001 to 004 of the production serial number 003 and unknown predicted values of the tags 005 and 006 of the production serial number 003 are substituted into a prediction equation of the tag 007.

FIG. 19 is a diagram illustrating another example for explaining process data or the predicted value thereof to be substituted into a prediction equation. When the value of the tag 007 illustrated in FIG. 4 is predicted, measured values or predicted values of sensors corresponding to respective tags are used as illustrated in FIG. 19 at the time point $t_2$ in FIG. 3. That is, when the value of the tag 007 of the production serial number 004 is predicted, known measured values of the tags 001 and 002 of the production serial number 004, a known measured value of the tag 004 of the production serial number 003, and unknown predicted values of the tags 003, 005, and 006 of the production serial number 004 are substituted into a prediction equation of the tag 007. As illustrated in FIG. 4, since there is no prediction equation for the value of the tag 004, a measured value of a most recent production serial number is used.

Furthermore, a value input to a prediction model is not limited to process data, and may be, for example, data based on operating conditions. By so doing, it is possible to predict results when the operating conditions of the plant 3 are changed. As described above, the quality prediction unit 144 calculates, for example, the predicted value of predetermined process data by using the prediction model and the output values of the sensors or the predicted value thereof.

Furthermore, the quality prediction unit 144 may obtain a predetermined confidence interval obtained in the aforementioned data cleansing, with respect to the calculated predicted value or the measured value of the process data, and allow the input/output apparatus 13 such as a monitor to display the predetermined confidence interval and the predicted value or measured value on a graph. By so doing, a user can visually ascertain the tendency, and use the tendency as a material for determining whether to change the operating conditions of the plant 3.

Furthermore, the plant control unit 145 may automatically change the operating conditions of the plant 3 on the basis of the calculated predicted value, or may output information that suggests changes in the operating conditions to the user via the input/output apparatus 13.

Prediction Processing (Continuous Stage)

Also in the continuous stage, the prediction processing illustrated in FIG. 14 is performed. Hereinafter, the differences from the batch stage are mainly described. It is assumed that the storage device 12 stores the date and time when the batch stage is ended and the transfer (liquid transfer) of a processing target to the continuous stage is completed for each sequence and each production serial number.

In the case of the continuous stage, the loading of the process data (FIG. 14: S2) does not adopt a method of loading in units of production serial numbers, but a method of continuously performing rolling in which new data is written and old data is deleted. Furthermore, the data structure of the writing array illustrated in FIG. 15 may be changed on the basis of the information registered in the field of type of the tag attribute table illustrated in FIG. 11. FIG. 20 is a diagram illustrating an example of a writing array for storing data of the type "continuous". The writing array for storing the data of the type "continuous" can be configured by deleting the S/N and the step from the table of FIG. 15, for example. Furthermore, FIG. 21 is a diagram illustrating an example of a writing array for storing data of the type "batch". The writing array for storing data of the type "batch" is, for example, a table that stores a production serial number and process data of the production serial number, and the table as illustrated in FIG. 21 is generated for each system. The data registered in the table of FIG. 21 may be the processed data registered in the batch array of FIG. 17.

Furthermore, the processing of the process data (FIG. 14: S3) is performed based on, for example, the timing of the stage inspection. The timing of the stage inspection is defined as a sampling interval in the traceability information. FIG. 22 is a diagram illustrating an example of a combination ID data array that stores process data after processing in the continuous stage. The combination ID data array may also be OPC data, may also be a so-called database table, or may also be a file having a predetermined format such as CSV. In the table of FIG. 22, identification information for identifying each stage inspection is registered in the field of stage inspection ID including attributes of stage inspection ID, sampling, and tag. The attributes of the sampling further include attributes of start date and time and end date and time, and the start date and time and end date and time of sampling of the stage inspection by the sample size reduction method are registered in the field of start date and time and end date and time, respectively. An analysis value corresponding to each tag is registered in the field of tag. For the tag in which "continuous" is registered in the field of type of the tag attribute table illustrated in FIG. 11, an average value of process data from the processing time point to the time when a sampling interval is traced back in the traceability information is registered. Furthermore, for the tag in which "batch" is registered in the field of type of the tag attribute table illustrated in FIG. 11, an average value of process data, which corresponds to a production serial number for which liquid transfer is completed from the processing time to the time when the sampling interval is traced back in the traceability information, is registered.

Furthermore, in the prediction model construction processing (FIG. 14: S4), for example, when the prediction model generation unit 143 acquires the analysis value of the stage inspection, a prediction model of the analysis value is updated. Also in this step, a prediction equation constituting the prediction model is generated on the basis of the tag combination table illustrated in FIG. 6. Furthermore, as illustrated in FIG. 9, in the continuous stage, the prediction model generation unit 143 may correlate the process data of the factor system and the process data of the influence system on the basis of the completion timing of the batch stage and a predetermined residence time, and cause the features of the process data obtained from the plant 3 to be learned. Furthermore, as illustrated in FIG. 10, the prediction model generation unit 143 may correlate the process data of the factor system with the process data of the influence system on the basis of the difference between the acquisition timing of the process data of the factor system and the acquisition timing of the process data of the influence system, and cause the features of the process data obtained from the plant 3 to be learned.

The quality prediction unit 144 of the prediction apparatus 1 performs the prediction processing by using the prediction model generated in the prediction model construction processing, and the process data or the predicted value thereof (FIG. 14: S5). In this step, the quality prediction unit 144 reads a most recent prediction model and process data, substitutes the process data or the predicted value thereof into the prediction equation included in the prediction model, and obtains a predicted value of a value corresponding to an influence system.

Control Processing

Figure 23:
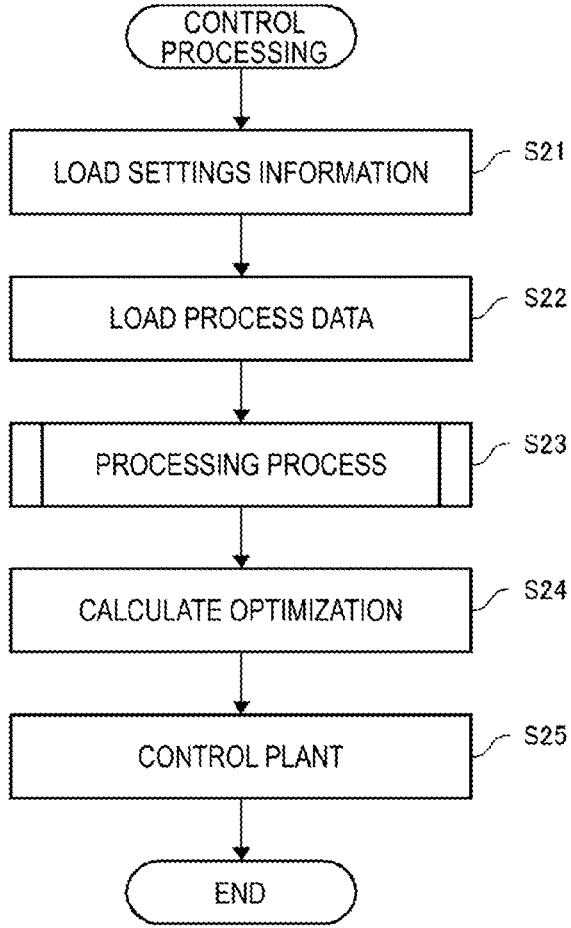
FIG. 23 is a processing flow chart illustrating an example of control processing performed by the prediction apparatus.

FIG. 23 is a processing flow chart illustrating an example of control processing performed by the prediction apparatus 1. The processor 14 of the prediction apparatus 1 performs the processing as illustrated in FIG. 23 by executing a predetermined program. The control processing is performed at any timing, for example, after a prediction model is updated. Also in the control processing, it is assumed that the tag attribute table of the batch stage illustrated in FIG. 5, the tag combination table illustrated in FIG. 6, the tag attribute table of the continuous stage illustrated in FIG. 11, the traceability information, and the like are stored in the storage device 12 in advance. Furthermore, it is assumed that the process data acquisition unit 141 continuously acquires process data from the sensors included in the plant 3 via, for example, the communication I/F 11 and the control station 2, and temporarily or permanently stores the acquired process data in the storage device 12.

The plant control unit 145 of the prediction apparatus 1 loads setting information (FIG. 23: S21). In this step, the plant control unit 145 reads the tag attribute table, the tag combination table, the traceability information, and the like from the storage device 12. In the control processing, the read information includes, for example, a goal of control represented as an objective function of an optimization problem or an acceptable region of control represented as a constraint condition of the optimization problem. It is assumed that the objective function minimizes the cost calculated by using the unit price registered in the field of cost impact of FIG. 5. Furthermore, it is assumed that the values registered in the fields of the management range and the setting range are constraint conditions.

Furthermore, the process data acquisition unit 141 loads the process data (FIG. 23: S22). The processing of this step is the same as that of S2 in FIG. 14. In this step, process data corresponding to tags used in a prediction equation is extracted, for example, for each prediction equation, for each sequence, and for each subdivided stage. Furthermore, the output values of the sensors are registered in the writing array illustrated in FIG. 15 or FIG. 20.

Furthermore, the process data processing unit 142 performs a predetermined processing process on the process data (FIG. 23: S23). The processing of this step is the same as that of S3 in FIG. 14.

Then, the plant control unit 145 performs arithmetic processing of an optimization problem (FIG. 23: S24). In this step, operational conditions for minimizing or maximizing the objective function under the read constraints are obtained. For example, when the cost is minimized on the basis of the setting illustrated in FIG. 5, the cost is obtained by Equation (3) below. Cost=(process data with tag 001×unit price) (process data with tag 002×unit price) (process data with tag 004×unit price) (3)

Furthermore, as a constraint condition, information registered in the "setting range" of FIG. 5 is used. Specifically, the following conditions are set.

Lower limit of tag 005≤predicted value of tag 005≤upper limit of tag 005

Lower limit of tag 007≤predicted value of tag 007≤upper limit of tag 007

Furthermore, as another constraint condition, information registered in the "management range" of FIG. 5 is used. Specifically, the following conditions are set.

Lower limit of tag 001≤value of tag 001≤upper limit of tag 001

Lower limit of tag 002≤value of tag 002≤upper limit of tag 002

Lower limit of tag 003≤value of tag 003≤upper limit of tag 003

Lower limit of tag 005≤value of tag 005≤upper limit of tag 005

Furthermore, in the present embodiment, the prediction model generated in the prediction processing is also used for the constraint conditions. For example, when a prediction equation is defined between process data in the logic trees as illustrated in FIG. 7 and FIG. 12, downstream process data is calculated on the basis of upstream process data on the basis of the prediction equation constructed in the prediction processing. Furthermore, data for a process located at an upstream end that corresponds to the tag in which "monitor" is registered in the field of "adjust/monitor" of FIG. 5, is acquired in S22, and a value processed in S23 is used. Then, when the aforementioned setting range and management range are set for an objective variable in each prediction equation, constraint conditions representing these ranges are set, an optimum value of an explanatory variable is searched for, and thus a predicted value falls within the range of the constraint conditions.

The optimization problem as described above can be solved by an existing solution. Note that it is assumed that an adjustment target is process data corresponding to the tag in which "adjust" is registered in the field of "adjust/monitor" of FIG. 5. That is, the process data with the tags 001, 003, 004, and 006 are adjustment targets, and a target tag does not necessarily match the constraint condition.

When the optimization problem is solved and operating conditions including setting values of process data to be adjusted are obtained, the plant control unit 145 controls the plant 3 according to the operating conditions (FIG. 23: S25). In this step, the plant control unit 145 outputs data indicating the operating conditions to the control stations 2 via the communication I/F 11. Then, the operation of the plant 3 is controlled according to the control signals from the control stations 2. Note that, for example, when a multi-objective optimization problem is solved in S24, a plurality of candidates for operating conditions may be presented to a user via the input/output device 13 and the plant 3 may be controlled on the basis of operating conditions selected by the user.

Variation

Each of the configurations, combinations thereof, and the like in each embodiment are an example, and various additions, omissions, substitutions, and other changes may be made as appropriate without departing from the spirit of the present invention. The present disclosure is not limited by the embodiments and is limited only by the claims. Each aspect disclosed in the present specification can be combined with any other feature disclosed herein.

Furthermore, although the above embodiment has been described by taking a chemical plant as an example, it can be applied to a manufacturing process in a general production facility. For example, instead of the production serial number of the batch stage in the embodiment, a lot number can be used as a transaction, and processing according to the batch stage in the embodiment can be applied.

At least some of the functions of the prediction apparatus 1 may be implemented by being distributed in a plurality of apparatuses, or the same function may be provided by a plurality of apparatuses in parallel. For example, a model generation apparatus that generates a prediction model, a prediction apparatus that makes a prediction by using the generated prediction model, and a control apparatus that controls a production facility by using the generated prediction model may be different from one another. Furthermore, at least some of the functions of the prediction apparatus 3 may be provided on a so-called cloud.

Furthermore, Equation (1) described above is a linear model including an autoregressive term, but is not limited to such an example. For example, a model including no autoregressive term can be employed. Furthermore, the model may be linear or non-linear. Furthermore, the model may be a single equation, and may employ a state space model that incorporates, for example, periodic variations such as seasonal variations. However, it is preferable that the model satisfies the code restriction. That is, the model determines the coefficient and the like of the prediction equation under the constraint that there is a certain correspondence relationship between the variation direction of the value of the factor system and the variation direction of the value of the influence system.

Furthermore, the present disclosure includes a method for performing the aforementioned processing, a computer program, and computer readable recording media storing the program. The program stored in the recording medium is executed by a computer, and thus the aforementioned processing can be performed.

The computer readable recording medium refers to a recording medium that can accumulate information such as data or programs by electrical, magnetic, optical, mechanical, or chemical actions, and can be read from a computer. Among such recording media, examples of recording media detachable from a computer include flexible disks, magneto-optical disks, optical disks, magnetic tapes, memory cards, and the like. Furthermore, as recording media fixed to a computer, there are HDD, solid state drive (SSD), ROM, and the like.

REFERENCE SIGNS LIST

1: Prediction apparatus
11: Communication I/F
12: Storage device
13: Input/output device
14: Processor
141: Process data acquisition unit
142: Process data processing unit
143: Prediction model generation unit
144: Quality prediction unit
145: Plant control unit
2: Control Station
3: Plant

The invention claimed is:

1. A prediction apparatus including:

a process data processing unit configured to perform a predetermined processing process on process data obtained from a chemical plant;

a prediction model generation unit configured to generate a prediction model having learned features of the process data obtained from the chemical plant, on the basis of causality information that defines a combination of first process data and second process data or a value corresponding to the second process data among the process data obtained from the chemical plant or the process data processed by the process data processing unit, the first process data being used as an explanatory variable, the second process data or the value corresponding to the second process data being used as a response variable; and a quality prediction unit configured to calculate a predicted value by using the prediction model and to output the predicted value, wherein the process data processing unit obtains a value corresponding to a reaction rate of a processing target in a predetermined period by using the process data including a temperature in a corresponding step representing the predetermined interval in a stage, and the value corresponding to the reaction rate is an integral value of the reaction rate.

2. The prediction apparatus according to claim 1, wherein the value corresponding to the reaction rate is calculated by using an Arrhenius equation, and a frequency factor and activation energy of a reaction rate constant are determined according to a type of chemical reaction and a processing target in the chemical plant.

3. The prediction apparatus according to claim 1, wherein the process data processing unit further obtains an integral value, a differential value, an average value, a maximum value, or a minimum value of the process data in a predetermined period, or an instantaneous value of the process data at a predetermined time point according to a type of the process data.

4. The prediction apparatus according to claim 1, wherein the prediction model has a hierarchical structure including a plurality of prediction equations, and includes a second prediction equation in which a predicted value calculated by a first prediction equation is included as an explanatory variable.

5. The prediction apparatus according to claim 1, wherein the value corresponding to the second process data is a value obtained by sampling a plurality of second process data by a sample size reduction method, and the prediction model generation unit generates the prediction model by correlating a range of acquisition timing of the first process data with calculation timing of the value corresponding to the second process data in the chemical plant, on the basis of a residence time of the processing target in the chemical plant.

6. The prediction apparatus according to claim 1, wherein the chemical plant performs a batch stage of sequentially processing a processing target on a transaction-to-transaction basis using a predetermined transaction and a subsequent continuous stage of continuously processing the processing target, and the prediction model generation unit generates the prediction model by correlating a range of completion timing of the batch stage and the calculation timing of the value corresponding to the second process data on the basis of the residence time of the processing target in the chemical plant.

7. A prediction method performed by a prediction apparatus, the prediction method comprising:

performing a predetermined processing process on process data obtained from a chemical plant;

generating a prediction model having learned features of the process data obtained from the chemical plant, on the basis of causality information that defines a combination of first process data and second process data or a value corresponding to the second process among the process data obtained from the chemical plant or the process data processed in the performing of the predetermined processing process, the first process data being used as an explanatory variable, the second process data or the value corresponding to the second process being used as a response variable; and calculating a predicted value by using the prediction model, and outputting the predicted value, wherein in the performing of the predetermined processing process, a value corresponding to a reaction rate of a processing target in a predetermined period is obtained by using the process data including a temperature in a corresponding step representing the predetermined interval in a stage, and the value corresponding to the reaction rate is an integral value rate of the reaction rate.

8. A non-transitory storage medium storing a program that causes a computer to:

perform a predetermined processing process on process data obtained from a chemical plant;

generate a prediction model having learned features of the process data obtained from the chemical plant, on the basis of causality information that defines a combination of first process data and second data or a value corresponding to the second process data among the process data obtained from the chemical plant or the process data processed in the performing of the predetermined processing process, the first process data being used as an explanatory variable, the second process data or the value corresponding to the second process data being used as a response variable; and calculate a predicted value by using the prediction model, and output the predicted value, wherein in the performing of the predetermined processing process, a value corresponding to a reaction rate of a processing target in a predetermined period is obtained by using the process data data including a temperature in a corresponding step representing the predetermined interval in a stage, and the value corresponding to the reaction rate is an integral value rate of the reaction rate.

* * * * *